(12) United States Patent
Cowelchuk et al.

(10) Patent No.: US 7,284,784 B2
(45) Date of Patent: Oct. 23, 2007

(54) AUTOMOTIVE BOLSTER WITH SOFT FEEL AND METHOD OF MAKING THE SAME

(75) Inventors: Glenn A Cowelchuk, Chesterfield Township, MI (US); Todd L DePue, Brighton, MI (US); David Dooley, Troy, MI (US)

(73) Assignee: Lear Corporation, Southfield, MI (US)

( * ) Notice: Subject to any disclaimer, the term of this patent is extended or adjusted under 35 U.S.C. 154(b) by 145 days.

(21) Appl. No.: 11/160,088

(22) Filed: Jun. 8, 2005

(65) Prior Publication Data

US 2006/0279100 A1 Dec. 14, 2006

(51) Int. Cl.
*B29C 45/14* (2006.01)
*B29C 45/10* (2006.01)
*B32B 7/02* (2006.01)
*B29C 44/06* (2006.01)

(52) U.S. Cl. .................. 296/153; 296/146.7; 264/45.1; 264/328.8

(58) Field of Classification Search ............. 296/146.7, 296/152, 153; 264/45.1–46.9, 255, 328.8; 52/511, 552, 716.5
See application file for complete search history.

(56) References Cited

U.S. PATENT DOCUMENTS

| 3,400,979 A | 9/1968 | James |
| 4,781,956 A | 11/1988 | Zimmermann et al. |
| 4,783,114 A | 11/1988 | Welch |
| 4,810,452 A | 3/1989 | Taillefert et al. |
| 4,882,842 A | 11/1989 | Basson et al. |
| 4,952,358 A * | 8/1990 | Okina et al. ................ 264/134 |
| 4,989,535 A | 2/1991 | Lacasse et al. |

(Continued)

FOREIGN PATENT DOCUMENTS

DE 3711079 A1 10/1988

(Continued)

OTHER PUBLICATIONS

Steven R. Sopher, *Advancements in Soft Polyolefin Bead Foams for Automotive Interior Trim Components*, Brochure, 2004, 10 pgs.

(Continued)

*Primary Examiner*—D. Glenn Dayoan
*Assistant Examiner*—Paul Chenevert
(74) *Attorney, Agent, or Firm*—Wood, Herron & Evans, LLP

(57) ABSTRACT

The present invention provides for an improved bolster with a soft feel for use in a trim assembly, and to a continuous two-shot molding operation that may be continuously performed utilizing a single mold assembly. In an exemplary embodiment, the bolster includes a substrate formed by co-injecting a first and second material into a first shot mold cavity in a first shot of a molding operation. In a second shot mold cavity, a cover is formed on at least a portion of the substrate by co-injecting into a mold chamber a third and fourth material in a second shot of the molding operation. The fourth material defines an outer skin surrounding the third material which may include a foamed material to provide a soft, light cellular inner core such that when a force is applied to the cover, the outer skin will deform and compress the inner core, providing a soft feel to the bolster.

8 Claims, 4 Drawing Sheets

U.S. PATENT DOCUMENTS

| | | | |
|---|---|---|---|
| 5,040,335 A | 8/1991 | Grimes | |
| 5,048,234 A | 9/1991 | Lau et al. | |
| 5,071,605 A | 12/1991 | Kawaguchi et al. | |
| 5,073,318 A | 12/1991 | Rohrlach et al. | |
| 5,178,807 A | 1/1993 | Thary | |
| 5,181,759 A | 1/1993 | Doolittle | |
| 5,224,299 A | 7/1993 | Abe | |
| 5,387,390 A | 2/1995 | Kornylo | |
| 5,399,393 A * | 3/1995 | Zoller | 428/31 |
| 5,433,910 A * | 7/1995 | Mukai et al. | 264/255 |
| 5,445,430 A | 8/1995 | Nichols | |
| 5,468,433 A | 11/1995 | Perry et al. | |
| 5,474,841 A | 12/1995 | Matsuki et al. | |
| 5,502,942 A * | 4/1996 | Gras et al. | 52/511 |
| 5,536,351 A | 7/1996 | Rheinlander et al. | |
| 5,571,581 A * | 11/1996 | Koizumi et al. | 428/31 |
| 5,571,597 A | 11/1996 | Gallagher et al. | |
| 5,573,617 A | 11/1996 | Franck et al. | |
| 5,590,901 A | 1/1997 | MacGregor | |
| 5,626,382 A * | 5/1997 | Johnson et al. | 296/146.7 |
| 5,663,210 A | 9/1997 | Sugimoto et al. | |
| 5,692,711 A | 12/1997 | Tucker | |
| 5,709,912 A * | 1/1998 | Goto et al. | 428/31 |
| 5,709,925 A | 1/1998 | Spengler et al. | |
| 5,715,966 A | 2/1998 | Nagano et al. | |
| 5,738,810 A | 4/1998 | De Fillippo | |
| 5,744,077 A * | 4/1998 | Grisch et al. | 264/46.6 |
| 5,786,047 A * | 7/1998 | Tomblin | 428/31 |
| 5,792,413 A | 8/1998 | Ang et al. | |
| 5,799,385 A | 9/1998 | Vecchiarino et al. | |
| 5,803,415 A | 9/1998 | Konishi et al. | |
| 5,810,388 A | 9/1998 | Berardi et al. | |
| 5,816,609 A | 10/1998 | Gray et al. | |
| 5,837,172 A * | 11/1998 | Pritchard et al. | 264/46.4 |
| 5,868,455 A * | 2/1999 | Springer et al. | 296/146.1 |
| 5,884,434 A | 3/1999 | Dedrich et al. | |
| 5,951,094 A | 9/1999 | Konishi et al. | |
| 5,952,630 A | 9/1999 | Filion et al. | |
| 5,967,594 A | 10/1999 | Ramanujam | |
| 5,976,289 A | 11/1999 | Kawakubo et al. | |
| 5,995,380 A | 11/1999 | Maue et al. | |
| 6,003,716 A | 12/1999 | Allison et al. | |
| 6,012,735 A | 1/2000 | Gray et al. | |
| 6,013,210 A | 1/2000 | Gardner, Jr. | |
| 6,017,617 A | 1/2000 | Gardner, Jr. | |
| 6,092,858 A * | 7/2000 | Bolwell | 296/146.7 |
| 6,116,674 A | 9/2000 | Allison et al. | |
| 6,123,385 A | 9/2000 | Bailey et al. | |
| 6,149,853 A | 11/2000 | Luckett et al. | |
| 6,168,188 B1 | 1/2001 | Preisler et al. | |
| 6,185,872 B1 | 2/2001 | Seeberger et al. | |
| 6,210,613 B1 | 4/2001 | Stein et al. | |
| 6,214,157 B1 | 4/2001 | Spengler | |
| 6,217,098 B1 | 4/2001 | O'Brien et al. | |
| 6,238,507 B1 | 5/2001 | Jones et al. | |
| 6,248,200 B1 | 6/2001 | Dailey et al. | |
| 6,251,326 B1 | 6/2001 | Siano et al. | |
| 6,319,438 B1 | 11/2001 | Smith et al. | |
| 6,364,351 B1 | 4/2002 | Hier et al. | |
| 6,368,093 B1 | 4/2002 | Vecchiarino et al. | |
| 6,381,906 B1 | 5/2002 | Pacella et al. | |
| 6,391,232 B1 | 5/2002 | Fritsch | |
| 6,409,947 B1 * | 6/2002 | Wandyez | 264/45.9 |
| 6,412,287 B1 | 7/2002 | Hughes et al. | |
| 6,433,728 B1 | 8/2002 | Krupp et al. | |
| 6,474,724 B2 | 11/2002 | Lemmon et al. | |
| 6,497,443 B2 | 12/2002 | Worrell et al. | |
| 6,526,762 B1 | 3/2003 | Barrow | |
| 6,544,449 B1 | 4/2003 | Gardner | |
| 6,568,707 B2 | 5/2003 | Hier et al. | |
| 6,588,821 B2 | 7/2003 | Worrell et al. | |
| 6,640,551 B1 | 11/2003 | Slone et al. | |
| 6,652,793 B2 | 11/2003 | Corrion et al. | |
| 6,688,640 B1 | 2/2004 | Davis, Jr. et al. | |
| 6,708,462 B2 * | 3/2004 | Pokorzynski et al. | 52/716.5 |
| 6,715,814 B1 | 4/2004 | Hoyle | |
| 6,740,390 B2 | 5/2004 | Randazzo | |
| 6,756,004 B2 | 6/2004 | Davis, Jr. et al. | |
| 6,758,510 B1 | 7/2004 | Starling | |
| 6,761,388 B2 | 7/2004 | Lein et al. | |
| 6,764,633 B2 | 7/2004 | Takahashi et al. | |
| 6,875,484 B1 * | 4/2005 | Kogure et al. | 428/34.1 |
| 6,921,571 B2 * | 7/2005 | Funakoshi | 428/156 |
| 6,981,735 B1 * | 1/2006 | Stephens | 296/153 |
| 7,108,312 B2 * | 9/2006 | Cowelchuk et al. | 296/146.7 |
| 7,156,437 B2 * | 1/2007 | Cowelchuk et al. | 296/1.08 |
| 2001/0030436 A1 | 10/2001 | Kifer et al. | |
| 2001/0047899 A1 | 12/2001 | Ikeda | |
| 2002/0043861 A1 | 4/2002 | Meadows | |
| 2002/0066972 A1 | 6/2002 | Fritsch | |
| 2002/0078695 A1 | 6/2002 | Hughes et al. | |
| 2002/0140246 A1 | 10/2002 | Worrell et al. | |
| 2002/0153741 A1 | 10/2002 | Speelman et al. | |
| 2003/0126866 A1 | 7/2003 | Spry | |
| 2003/0155787 A1 | 8/2003 | Lein et al. | |
| 2003/0184064 A1 | 10/2003 | Hier et al. | |
| 2003/0184108 A1 | 10/2003 | Donovan et al. | |
| 2003/0209888 A1 | 11/2003 | Davis, Jr. et al. | |
| 2003/0209892 A1 | 11/2003 | Hier et al. | |
| 2004/0017023 A1 | 1/2004 | Schoemann et al. | |
| 2004/0025517 A1 | 2/2004 | Fong | |
| 2004/0035119 A1 | 2/2004 | Slone et al. | |
| 2004/0068992 A1 | 4/2004 | Cauchy | |
| 2004/0119267 A1 | 6/2004 | Cowelchuck | |
| 2004/0119268 A1 | 6/2004 | Davis, Jr. et al. | |
| 2004/0130051 A1 | 7/2004 | Cowelchuk et al. | |
| 2005/0079336 A1 * | 4/2005 | Dry et al. | 428/304.4 |
| 2005/0183897 A1 * | 8/2005 | DePue | 180/90 |
| 2005/0258666 A1 * | 11/2005 | Reed | 296/153 |
| 2006/0082190 A1 * | 4/2006 | Cowelchuk et al. | 296/153 |
| 2006/0216479 A1 * | 9/2006 | Cowelchuk et al. | 428/174 |

FOREIGN PATENT DOCUMENTS

| | | | |
|---|---|---|---|
| DE | 19534982 C2 | 6/1996 | |
| DE | 4480340 C2 | 12/1996 | |
| DE | 19733667 C2 | 2/1999 | |
| JP | 62170303 A * | 7/1987 | 264/46.4 |
| JP | 63082847 A * | 4/1988 | 264/46.4 |

OTHER PUBLICATIONS

German Patent and Trademark Office, Office Action in related U.S. Appl. No. 11/160,088, mailed Jan. 26, 2007 (5 pages).

* cited by examiner

AUTOMOTIVE BOLSTER WITH SOFT FEEL AND METHOD OF MAKING THE SAME

CROSS-REFERENCE

The present invention is related to U.S. Ser. No. 10/708,312, filed Feb. 24, 2004, U.S. Ser. No. 10/708,315, filed Feb. 24, 2004, U.S. Ser. No. 10/708,500, filed Mar. 8, 2004, U.S. Ser. No. 10/709,382, filed Mar. 30, 2004, U.S. Ser. No. 10/710,305, filed Jul. 1, 2004, U.S. Ser. No. 10/904,015, filed Oct. 19, 2004, U.S. Ser. No. 10/904,007, filed Oct. 19, 2004, U.S. Ser. No. 10/904,008, filed Oct. 19, 2004, U.S. Ser. No. 10/904,010, filed Oct. 19, 2004, U.S. Ser. No. 10/904,011, filed Oct. 19, 2004, U.S. Ser. No. 10/904,032, filed Oct. 20, 2004, U.S. Ser. No. 10/711,692, filed Sep. 30, 2004, U.S. Ser. No. 10/904,033, filed Oct. 20, 2004, U.S. Ser. No. 10/904,433, filed Nov. 10, 2004, U.S. Ser. No. 10/904,409, filed Nov. 9, 2004, U.S. Ser. No. 10/904,408, filed Nov. 9, 2004, and U.S. Ser. No. 10/904,407, filed Nov. 9, 2004.

FIELD OF THE INVENTION

The present invention pertains generally to trim assemblies for automotive interiors and, more particularly, to automotive bolsters with a soft feel such as for use in trim assemblies, and to a method of making the same.

BACKGROUND OF THE INVENTION

It is known to provide automotive interiors with various trim parts to enhance the aesthetic appearance of the automotive interior and to provide comfort, as well as convenience, to vehicle occupants. Examples of these interior trim parts include instrument trim panels, door trim panels, console panels, armrests, bolsters, and handles. To increase the aesthetic appearance of these trim parts and to improve the comfort to vehicle occupants, it is often desired to provide at least portions of the trim part, such as the bolster, with areas that are cushy or soft to the touch.

One primary drawback with current bolsters is in the manufacturing and assembly thereof. Bolsters having a soft feel, typically, have been formed by insertion of a resilient soft padding material beneath a pliable surface layer of leather, vinyl, or fabric material. The preformed soft, resilient pad also may be secured to a rigid plastic shell and a pliable skin layer stretched over the pad and secured to the shell to form the trim part. In another conventional method of forming padded trim parts, a foam material may be injected between a rigid substrate and a skin layer joined to the substrate.

In addition, skin layers having bumps or nibs formed on the B-side, or back surface, thereof have been applied over rigid substrates in an effort to improve the feel of non-padded trim parts. The nibs raise the skin layer slightly away from the rigid substrate to create "soft" areas that deform when a force is applied to the trim assembly. As such, it is the nib design that provides these soft areas. Also, while these nibbed trim assemblies offer a compromise between padded trim assemblies, they are still costly due to the fact that the skin layer must be manufactured separately in order to create the bumps or nibs. Consequently, the above noted methods are generally costly due to the multiple and expensive materials and/or components and extra manufacturing steps required to make these trim assemblies.

There is thus a need for an improved bolster with a soft feel for use in a trim assembly, and a method for making the same, that can reduce the number of parts and labor and costly materials required for assembly thereof, thereby reducing overall manufacturing costs.

SUMMARY OF THE INVENTION

The present invention provides for an improved bolster with a soft feel for use in a trim assembly, e.g. a door trim panel assembly.

To this end, the bolster includes a substrate made from a first and a second material and a cover made from a third and fourth material. The second material of the substrate surrounds the first material and defines an outer skin layer while the fourth material of the cover surrounds the third material and defines an outer skin layer on the A-side, i.e. the viewable side, of the bolster. The cover is integrally molded to at least a portion of the substrate.

The second material and fourth material may be chosen from a thermoplastic polymer, such as a thermoplastic elastomer, a thermoplastic olefin, e.g. polypropylene, and the like. The second and fourth materials further may include additives, such as a color additive, a UV stabilizer, a flame retardant, etc. The first and third materials may be chosen from a foamed or blown thermoplastic polymer, such as a foamed or blown thermoplastic elastomer, a foamed or blown thermoplastic olefin, e.g. foamed or blown polypropylene, and the like. The foamed or blown material produces a lightweight inner core such that when a force is applied to the cover a soft feel is provided to the bolster.

The first and third materials further may be chosen from a thermoplastic polymer, such as a thermoplastic elastomer, a thermoplastic olefin, e.g. polypropylene, and the like that has been recycled and/or includes additives such as talc, glass, etc. It should be understood that the second and fourth materials may be different and that the first and third materials similarly may be different. At least one of the first, second, third, or fourth materials should be selected to provide a soft feel for the bolster.

The substrate further may include at least one heat stake member such as for securing the bolster to a trim panel for use in a trim panel assembly. The heat stake member may be formed from the first and/or second material and is integral therewith. In one example, the heat stake member defines a post adapted to be heat staked to a trim panel. In the alternative, the bolster, i.e. the substrate and cover, may be provided with one or more apertures for receiving a heat stake member associated with a trim panel to secure the bolster thereto.

The automotive bolster with soft feel is formed in a continuous two-shot molding process. In this operation, a mold assembly is provided in which the substrate of the bolster is formed by co-injecting the first and second materials into a first shot mold cavity in a first shot of the molding operation. The second material forms the outer skin layer that surrounds the first material. A core of the mold assembly is used, e.g. rotated, to move the substrate from the first shot mold cavity to a second shot mold cavity, and a mold chamber is formed about at least a portion of the substrate within the second shot mold cavity.

The cover then is integrally molded thereover by co-injecting into the mold chamber the third and fourth materials in a second shot of the molding operation. The fourth material forms the outer skin layer that surrounds the third material. At least one of the materials provides the bolster with a soft feel. In an exemplary embodiment, the mold assembly for forming the bolster with soft feel includes first and second shot mold cavities and a rotatable core having first and second male portions adapted to mate with each cavity for forming a plurality of bolsters in a continuous manner.

By virtue of the foregoing, there is thus provided an improved bolster with a soft feel for use in a trim assembly, and a method of making the same, that reduces the number of parts and the labor, and costly materials, required for assembly thereof thereby reducing overall manufacturing costs.

The features and objectives of the present invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION OF THE DRAWINGS

Figure 1:
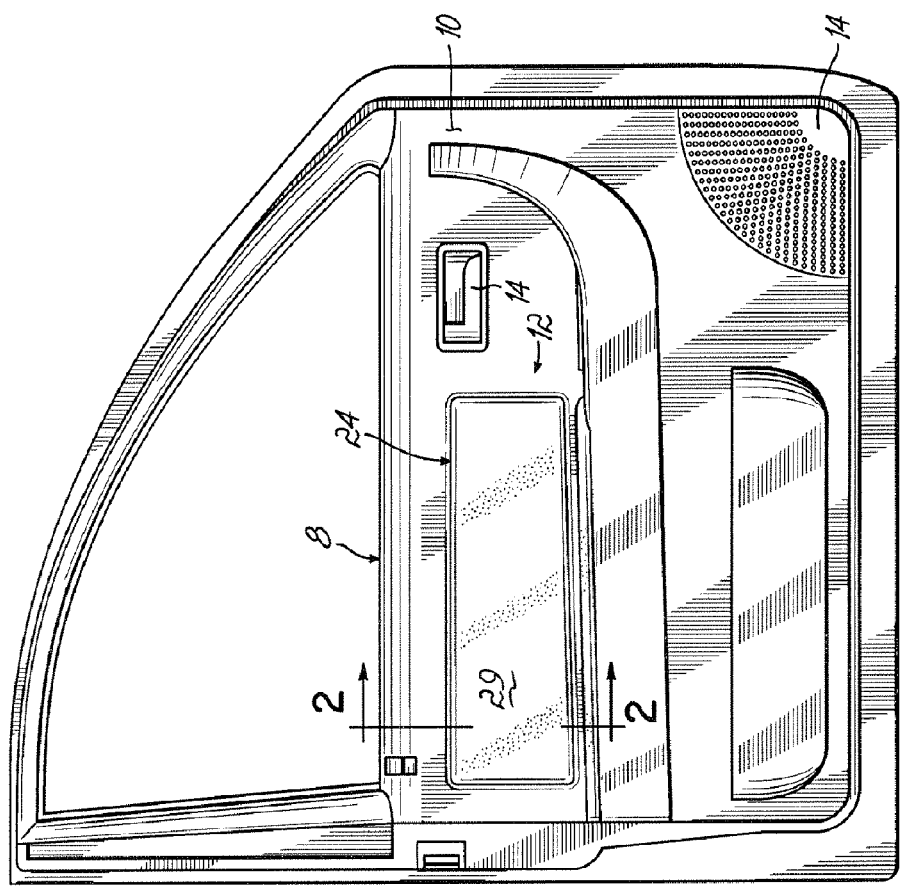
FIG. 1 is an elevational view of an automotive interior trim assembly having a bolster with soft feel according to the present invention.

In FIG. 1, an automotive interior trim assembly, i.e. a door trim panel assembly 8, for an automobile (not shown) includes a door trim panel 10 provided with an embodiment of the bolster 12 with soft feel in accordance with the present invention. It should be understood that the bolster 12 with soft feel, although illustrated and described herein below as being a separate or add-on component, may be molded by the methods disclosed below wherein the bolster 12 with soft feel is integrally molded with the door trim panel 10 of the trim panel assembly 8. In addition, it should be understood that other various trim assemblies, such as consoles, may incorporate the bolster 12 with soft feel.

Figure 2:
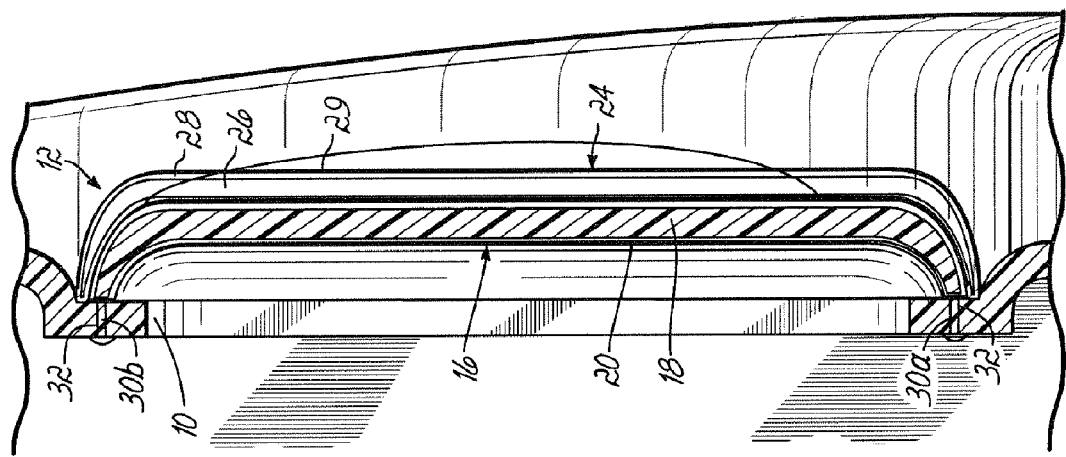
FIG. 2 is a cross-sectional view of the bolster of FIG. 1 taken along lines 2-2.

As further shown in FIGS. 1 and 2, the bolster 12 covers a portion of the interior of the door trim panel 10 such as to provide a more aesthetically pleasing environment. In addition, the soft feel of the bolster 12 provides added comfort to the vehicle's occupants such as when an occupant chooses to rest an arm thereagainst. A variety of openings 32 can be included in the trim panel 10 so as to accommodate the placement of hardware components 14 such as a speaker(s), door handle, window controls, etc., and further to accommodate the bolster 12, as explained below.

With continued reference to FIGS. 1 and 2, the bolster 12 includes a substrate 16 made from a first material 18 and a second material 20. The second material 20 of the substrate 16 defines an outer skin layer that suffounds the first material 18. The bolster 12 further includes a cover 24 made from a third material 26 and fourth material 28. The fourth material 28 of the cover 24 similarly defines an outer skin layer that suffounds the third material 26. This outer skin layer of the fourth material 28 includes the A-side, or viewable side 29, of the bolster 12. The cover 24 is bonded, i.e. integrally molded, to at least a portion of the substrate 12. More specifically, the fourth material 28 is bonded to at least a portion of the second material 20.

Concerning the substrate 16 and cover 24, the second material 20 and fourth material 28 may be chosen from a thermoplastic polymer, such as a thermoplastic elastomer, a thermoplastic olefin, e.g. polypropylene, and the like. The second and fourth materials 20, 28 further may include additives, such as a color additive, a UV stabilizer, a flame retardant, etc. The first and third materials 18, 26 may be chosen from a thermoplastic polymer, such as a thermoplastic elastomer, a thermoplastic olefin, e.g. polypropylene, and the like that has been either foamed or blown, and/or recycled, and/or may include one or more additives such as talc, glass, etc. such as to reduce the weight and/or cost of the first and/or third materials. One of the first, second, third, or fourth material 18, 20, 26, 28 of the bolster 12 should be selected so as to provide the soft feel for the bolster 12. In addition, the materials 18, 20, 26, 28 may be selected so as to enhance rigidity of the bolster 12 such as by increasing the strength of the substrate 16, thereby reducing warping.

As is understood in the art, to produce a foamed or blown thermoplastic material, a chemical foaming or physical blowing agent typically is combined, or mixed, therewith to produce a lightweight material. Any known chemical foaming agent or physical blowing agent suitable for producing the foamed or blown thermoplastic polymers of the first and/or third materials 18, 26 may be used. For example, the chemical foaming agent may be an endothermic or exothermic foaming agent, such as sodium bicarbonate, citric acid, and the like which reacts generally when heated to a specified temperature to produce a gas, such as carbon dioxide or nitrogen, that becomes trapped within the polymer thereby producing the lightweight polymer material. The physical blowing agent may be, for example, carbon dioxide, nitrogen, or a chlorofluorocarbon, hydro-fluorocarbon, hydrochlorofluorocarbon, and the like which may be directly injected into the thermoplastic polymer to produce the lightweight polymer material. The foamed or blown polymer produces a lightweight inner core such that when a force is applied to the cover 24 a soft feel is provided to the bolster 12.

The substrate 16 further includes two heat stake members 30a and 30b, although one or more than two may be provided, for securing the bolster 12 to the trim panel 10. The heat stake members 30a, 30b are formed from the second material 20 and are integral with the outer skin layer. However, it should be understood that the heat stake members 30a, 30b may be integrally formed from the first and/or second materials 18, 20. The heat stake members 30a, 30b define posts which are inserted through openings 32 in the door trim panel 10 and, as is commonly understood in the art, heat staked to secure the bolster 12 thereto. In the alternative, it is understood that the bolster 12, i.e. the substrate 16 and cover 24, may be provided with one or more apertures (not shown) therethrough for receiving one or more heat stake members associated with, e.g. attached to, the trim panel 10 to secure the bolster 12 thereto.

With continuing reference to FIGS. 1 and 2, as one example, the first and third materials 18, 26 are foamed thermoplastic polymers while the second and fourth materials 20, 28 are colored thermoplastic polymers. However, it should be understood that the second and fourth materials 20, 28 may be different and that the first and third materials 18, 26 similarly may be different. Accordingly, in another example, the first material 18 is a recycled thermoplastic olefin, the second and fourth materials 20, 28 are colored thermoplastic olefins, and the third material 26 is a blown thermoplastic olefin. In addition, the feel of the bolster 12 may be selectively tuned to a desired softness by varying the thickness of the cover 24 and/or substrate 16.

Figure 3:
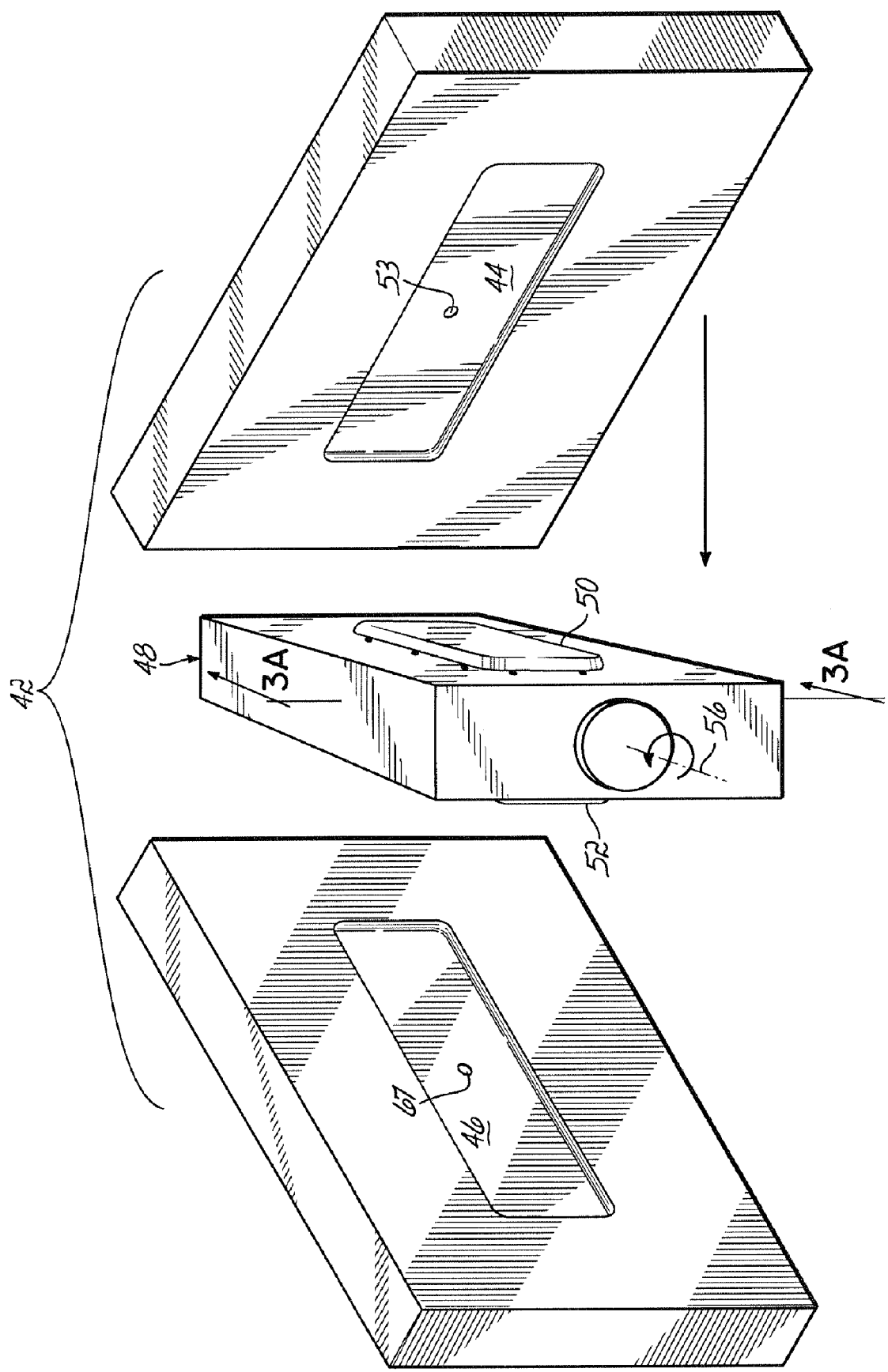
FIG. 3 is a disassembled perspective view of a mold assembly used to form the bolster with soft feel of the present invention.
Figure 4A:
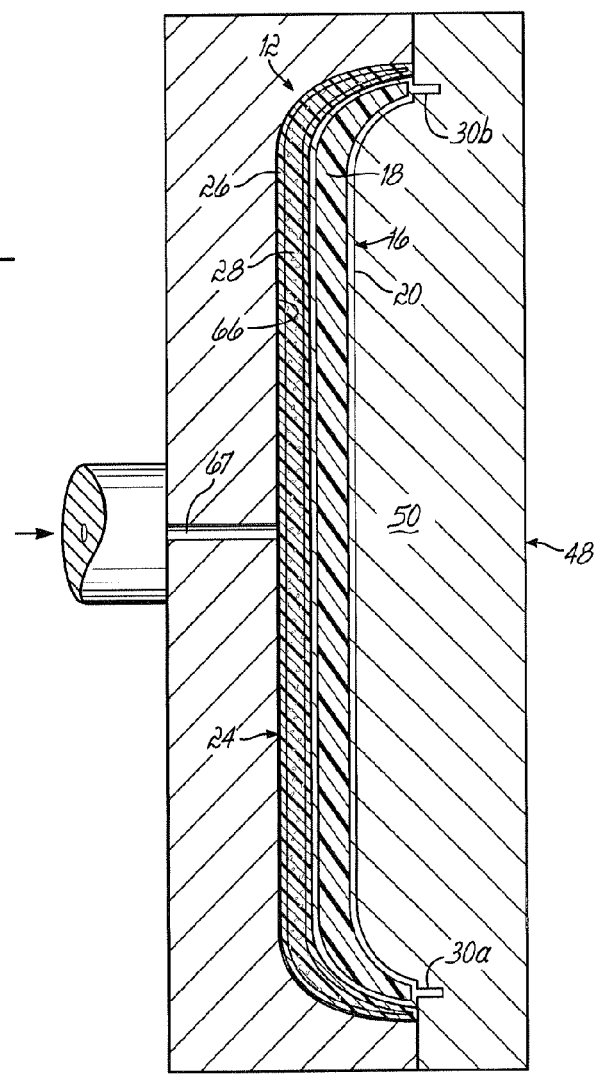
FIG. 4A is a cross-sectional view of the mold of FIG. 4 taken along the line 4A-4A illustrating the second shot of the molding operation.
Figure 4:
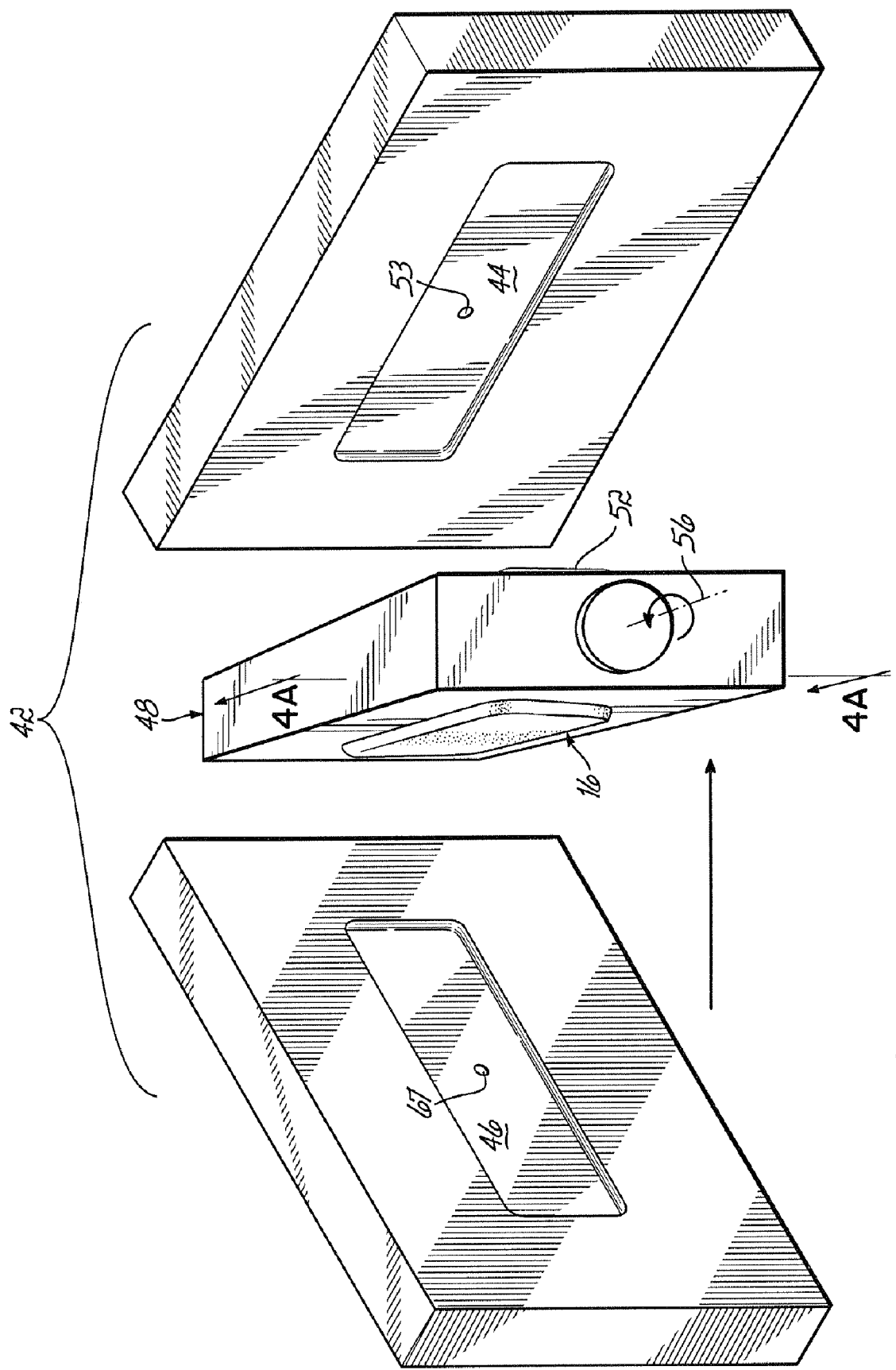
FIG. 4 is a disassembled perspective view of the mold assembly of FIG. 3 depicting the movement from the first shot mold cavity to the second shot mold cavity of the formed substrate of FIG. 3A.

With reference to FIGS. 3-4A, a method of making the automotive bolster 12 with soft feel of the present invention will now be described. A single mold assembly 42 is shown in FIG. 3 including spaced apart first and second shot mold cavities 44 and 46 and a central core 48 having first and second male portions 50 and 52 adapted to mate with each cavity 44, 46. The core is 48 situated between the mold cavities 44, 46 and is adapted to rotate about a central axis, i.e. a horizontal axis 56, so that the first and second male portions 50, 52 can mate, in turn, with the mold cavities 44, 46 to mold, in sequence, first the substrate 16 then the cover 24 in a continuous manner. It should be understood by the artisan that variations of the mold assembly 42 may be provided and still fall within the scope of this invention. For example, any number of core male portions 50, 52, i.e. more or less than shown, may be provided, in conjunction with the necessary number of corresponding first and second shot mold cavities 44, 46, for molding the bolster 12 with soft feel.

Figure 3A:
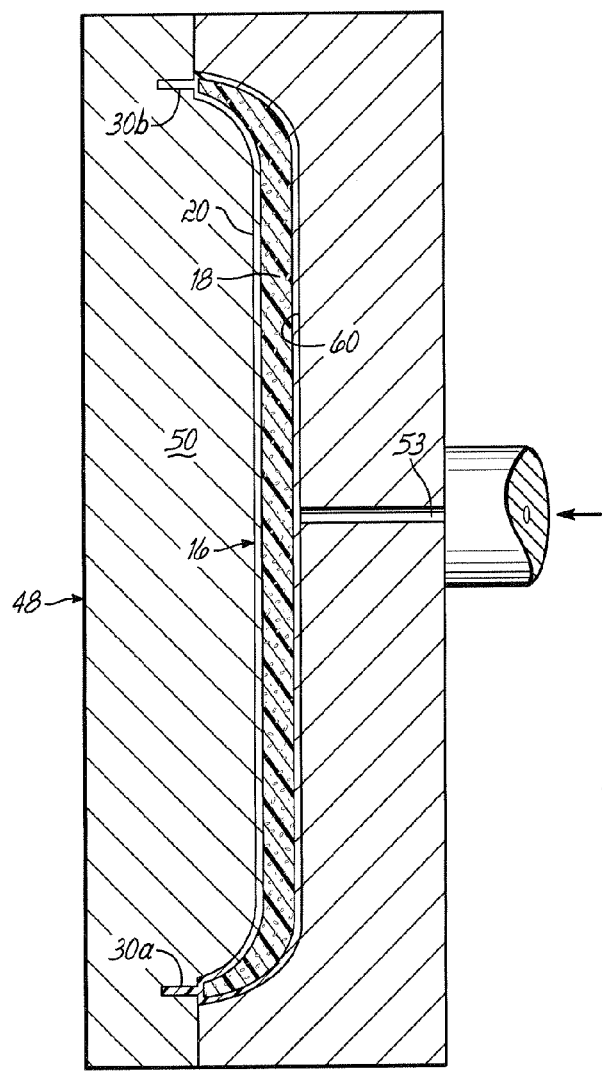
FIG. 3A is a cross-sectional view of the mold of FIG. 3 taken along the line 3A-3A illustrating the first shot of the molding operation.

While the first and second shots of the molding operation are further described below with respect to the first male portion 50 by utilizing the cross-sectional views of FIGS. 3 and 4, it is understood that the first and second shot molding process occurs in the same fashion with respect to the second male portion 52. Accordingly, as best shown in FIGS. 3 and 3A, the first male portion 50 of the core 48 mates with the first shot mold cavity 44 and, more specifically, the first shot mold cavity 44 is adapted to move toward the first male portion 50, as is commonly known in the art, to form a first shot chamber 60.

In a first shot of the molding operation, the first and second materials 18, 20 are co-injected into the chamber 60 through channel 53 to form the substrate 16 including heat stake members 30a, 30b. More specifically, the first material 18 is injected into chamber 60 through channel 53 followed by the second material 20 wherein the second material 20 surrounds the first material 18 to define the outer skin layer. The heat stake members 30a, 30b, which define posts, are formed from the second material 20 and are integral with the outer skin layer. Although the first shot of the molding operation describes forming the substrate 16, it is contemplated that the cover 24, alternatively, could be formed in the first shot with the substrate 16 subsequently being formed in the second shot as discussed below.

In this example, the first material 18 is a foamed thermoplastic polymer wherein, for example, a chemical foaming agent, such as sodium bicarbonate, is combined, or premixed, with the thermoplastic polymer prior to co-injection into the chamber 60 to form the foamed polymer. The second material 20 is a colored thermoplastic polymer. The substrate 16, specifically, is molded over the first male portion 50 so that the first male portion 50 retains the substrate 16.

With further reference to FIGS. 4 and 4A, the first shot mold cavity 44 is retracted, or moved away from, the first male portion 50, and the core 48 having the first male portion 50 provided with the substrate 16 then is rotated about the horizontal axis 56 to move the substrate 16 from the first shot mold cavity 44 to the second shot mold cavity 46. It should be understood that the core 48 also may rotate about a vertical axis (not shown) or be adapted to move, or slide, sideways to a second shot mold cavity. Next, the first male portion 50 of the core 48 mates with the second shot mold cavity 46 and, more specifically, the second shot mold cavity 46 is adapted to move toward the first male portion 50, as is commonly known in the art, to form a second shot chamber 66 about at least a portion of the substrate 16.

In a second shot of the molding operation, the third and fourth materials 26, 28 are co-injected into the second shot chamber 66 through channel 67 to form the cover 24. More specifically, the third material 26 is injected into chamber 66 through channel 67 followed by the fourth material 28 wherein the fourth material 28 surrounds the third material 26 to define the outer skin layer with this outer skin layer including the A-side, or viewable side 29, of the bolster 12. Although single channels or barrels 53, 67 are utilized for co-injecting the materials 18, 20, 26, 28 in the first and second shots of the molding operation, it should be understood that twin-barrels, as known in the art, similarly may be utilized for the first and second shots.

In this example, the third material 26, like the first material 18, is a foamed thermoplastic polymer wherein, for example, a chemical foaming agent, such as sodium bicarbonate, is combined, or pre-mixed, with the thermoplastic polymer prior to co-injection into the second shot chamber 66 to form the foamed polymer. The fourth material 28, like the second material 20, is a colored thermoplastic polymer. Notably, the cover 24 is bonded, or integrally molded, to at least the portion of the substrate 12.

One of the first, second, third, or fourth materials 18, 20, 26, 28 of the bolster 12 should be selected so as to provide the soft feel for the bolster 12. Accordingly, the first and third foamed materials 18, 26, in this example, produce lightweight inner cores such that when a force is applied to the cover 24 a soft feel is provided to the bolster 12. In addition, the feel of the bolster 12 may be adjusted to any desired softness by varying the thickness of the cover 24 and/or substrate 16.

After the materials 18, 20, 26, 28 have been allowed time sufficient to cure, the second shot mold cavity 46 is retracted, or moved away from, the first male portion 50, and the bolster 12 with soft feel is ejected from the first male portion 50, such as by ejector pins (not shown), so that the process may begin anew. Although not illustrated, it is understood that the second male portion 52 also is adapted to mate with the first shot cavity 44, during the mating of the first male portion 50 with the second shot mold cavity 46, to form a second substrate (not shown) that may be identical to the first substrate 24 by co-injecting the first and second materials 18, 20 into the first shot mold cavity 44 in the first shot of the molding operation. After injection, the core 48 with the second male portion 52 similarly rotates the second substrate to the second shot mold cavity 46 for the second shot of the molding operation while the first male portion 50 returns to the first shot mold cavity 44 to repeat the first shot of the molding operation. In this fashion, a plurality of bolsters 12 with soft feel may be formed in a continuous and efficient manner.

Accordingly, the molding operation of the present invention may be continuously performed utilizing a single mold assembly 42 to provide the bolster 12 with a soft feel. With further reference to FIGS. 1 and 2, the door trim panel 10 includes the formed bolster 12 with soft feel having been secured thereto by heat stake members 30a, 30b.

Although the method of making utilizes a single mold assembly 42 for a continuous, integrated process, it still should be understood that the molding process may be performed in more than one mold assembly such that the substrate 16 may be moved from the first shot mold cavity 44 after the first shot to a second shot mold cavity 46 provided in a second, separate mold assembly for the second shot of the molding operation. Movement can be manual or by other means commonly known in the art, e.g. robotic.

In addition, the mold assembly 42 may be adapted to provide the bolster 12, i.e. the substrate 16 and cover 24, with one or more apertures (not shown) for receiving one or more heat stake members associated with, e.g. attached to, the trim panel 10 to secure the bolster 12 thereto.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicant's general inventive concept.

What is claimed is:

1. An automotive bolster with soft feel, comprising:
   a substrate made from a first and second material, the second material being different than the first material and defining an outer skin layer which completely surrounds the first material, the substrate further including at least one heat stake member adapted to secure the bolster to a trim panel, the at least one heat stake member being formed from at least one of the first and second materials; and
   a cover made from a third and fourth material, the fourth material being different than the third material and defining an outer skin layer which surrounds the third material, the cover being integrally molded to at least a portion of the substrate, wherein at least one of the materials provides the bolster with a soft feel.

2. The automotive bolster of claim 1, wherein at least one of the first and third materials is a foamed or blown thermoplastic polymer.

3. The automotive bolster of claim 1, wherein at least one of the first and third materials includes recycled thermoplastic polymer.

4. The automotive bolster of claim 1, wherein at least one of the second and fourth materials includes a colored thermoplastic polymer.

5. An automotive bolster with soft feel, comprising:
   a substrate made from a first and second material, the second material being different than the first material and defining an outer skin layer which surrounds the first material, the substrate further including at least one heat stake member adapted to secure the bolster to a trim panel, the at least one heat stake member being formed from at least one of the first and second materials; and
   a cover made from a third and fourth material, the fourth material being different than the third material and defining an outer skin layer which completely surrounds the third material, the cover being integrally molded to at least a portion of the substrate, wherein at least one of the materials provides the bolster with a soft feel.

6. The automotive bolster of claim 5, wherein at least one of the first and third materials is a foamed or blown thermoplastic polymer.

7. The automotive bolster of claim 5, wherein at least one of the first and third materials includes recycled thermoplastic polymer.

8. The automotive bolster of claim 5, wherein at least one of the second and fourth materials includes a colored thermoplastic polymer.

* * * * *